United States Patent [19]

Morehouse et al.

[11] Patent Number: 4,536,408

[45] Date of Patent: Aug. 20, 1985

[54] LOW FAT SPREAD

[75] Inventors: Alpha L. Morehouse; Charles J. Lewis, both of Muscatine, Iowa

[73] Assignee: Grain Processing Corporation, Muscatine, Iowa

[21] Appl. No.: 531,752

[22] Filed: Sep. 12, 1983

[51] Int. Cl.$^3$ .................. A23D 3/00; A23D 3/02; A23L 1/27

[52] U.S. Cl. .................. 426/250; 426/603; 426/613; 426/654; 426/658; 426/804

[58] Field of Search .............. 426/578, 603, 604, 613, 426/654, 658, 661, 250

[56] References Cited

U.S. PATENT DOCUMENTS

| | | | |
|---|---|---|---|
| Re. 30,086 | 8/1979 | Carlile et al. | 426/603 |
| 3,962,465 | 6/1976 | Richter et al. | 426/578 X |
| 3,986,890 | 10/1976 | Richter et al. | 426/578 X |
| 4,160,850 | 7/1979 | Hallstrom et al. | 426/601 |
| 4,238,520 | 12/1980 | Miller et al. | 426/604 |
| 4,292,333 | 9/1981 | Bosco et al. | 426/604 X |
| 4,307,125 | 12/1981 | Amer | 426/604 |

FOREIGN PATENT DOCUMENTS 1423780 2/1976 United Kingdom .

OTHER PUBLICATIONS

Wiedermann, L. H., "Margarine and Margarine Oil, Formulation and Control", J.A.O.C.S, 55, 1978, pp. 823-829.

*Primary Examiner*—Robert Yoncoskie
*Attorney, Agent, or Firm*—Neuman, Williams, Anderson & Olson

[57] ABSTRACT

Margarine or butter-like spreads of reduced caloric values which involve an edible fat at levels of from about 15 to 35% by weight of the spread and a low D.E. non-gelling starch hydrolyzate having a D.E. value of about 4 and not more than 25.

19 Claims, No Drawings

LOW FAT SPREAD

The present invention relates to comestible spreads useful as margarine or butter substitutes having reduced caloric content.

Current concern about the effects of excessive fat consumption on health and the problem of obesity in some populations have created a demand for low calorie, low fat butter substitutes or diet spreads. A number of proposals for producing low calorie diet spreads are reported in the literature and several low calorie imitation margarine products are currently commercially available.

The reduction in calorie content is generally achieved in these prior art products by increasing the water content and lowering the fat content of the products to the range of about 40 to 60%. In order to obtain such fat contents, the addition of various emulsifiers and/or other ingredients to maintain a stable, plastic emulsion of the water-in-oil type is generally required. Further reduction in fat content and caloric content, while desired, has been most difficult to achieve because of problems in maintaining the oil as the continuous phase which is required so that the product exhibits natural texture and mouthfeel. Moreover, the combination of fats and emulsifiers and/or other ingredients such as hydrocolloids employed in a number of prior art low calorie spreads impart a waxy mouthfeel and provide melting characteristics bearing little resemblance to conventional margarines or natural butter.

It is a major object of this invention to provide low calorie spreads closely resembling margarine or butter in texture and mouthfeel which are water-in-oil emulsions and which do not involve the use of fat emulsifiers.

It is a further object of the invention to provide methods for preparing low calorie spreads closely resembling margarine or butter which involve the use of known, inexpensive and readily available ingredients.

An additional object of the invention is to provide low caloric spreads which are more economical than natural butter or margarine.

It is still another object of the invention to provide compositions in dry form which can be readily converted by the ultimate user into a plastic butter-like spread.

The present invention is based on the discovery that margarine or butter-like spreads which are water-in-oil emulsions can be prepared by utilizing low dextrose equivalent (D.E.) starch hydrolyzates to replace a substantial portion of the fat component of such spreads. Since fat contributes about 9 calories per gram and carbohydrate only about 4 calories per gram, the substitution for fat of the low D.E. starch hydrolyzates provides a very advantageous means of lowering the calorie levels of diet spreads below that previously visualized. Thus, spread products of this invention possess important advantages over prior low calorie spreads by providing diet spreads with both significantly reduced fat and calorie levels which are water-in-oil emulsions having a consistency, texture and mouthfeel very similar to natural butter or margarine.

According to one embodiment of this invention products resembling margarine but of reduced calorie content are prepared by dispersing a low D.E. starch hydrolyzate in water at a concentration of say 20–40% weight/weight and slowly mixing therewith a fat which gradually forms an oil-in-water emulsion. Mixing is continued and preferably the mixture is also cooled, say to a temperature of about 20° C., until phase inversion occurs and a water-in-oil emulsion is produced which has the consistency of butter. Salt, flavor and color ingredients are added and blended in to produce an imitation margarine. The relative amounts of fat and starch hydrolyzate must be regulated to obtain rapid phase inversion and complete emulsification of the oil and water mixture. The particular length of time required to achieve phase inversion depends on several factors, including the type of fat employed, the manner of mixing and the rate of cooling. By rapid phase inversion it is meant that phase inversion is accomplished within about 10 minutes upon mixing.

We have found that good imitation margarines are produced when the low D.E. starch hydrolyzate comprises from about 15 to 35% by weight of the composition and the fat component comprises from about 15 to 35% by weight with the remainder being water together with very small amounts of flavors and coloring agents. It is generally preferred to employ the fat and starch hydrolyzates in a weight ratio of 0.5:1 to 1.6:1 and most preferably in a ratio of 0.8:1 to 1.4:1. One particularly preferred imitation margarine composition comprises approximately 20% by weight fat, approximately 25% by weight starch hydrolyzate and approximately 55% by weight water.

The fat employed to form a spread in accordance with the invention is an edible animal or vegetable fat which is normally congealed (solid) at room temperature (70°-72° F.) and having a melting point above about 38° C. (100° F.). Fats having melting points substantially below 32° C. (90° F.) generally are not satisfactory in that they do not undergo phase inversion readily and do not provide a product with the desired butter-like consistency at ambient temperatures. However, some fats melting below about 32° C. do give satisfactory results when blended with a higher melting fat. Fat compositions obtained by blending low melting fats with high melting fats may exhibit improved texture and cold spreadability over that provided by the individual fats. A preferred blend is that of a partially hydrogenated vegetable fat and butterfat. Examples of useful suitable fats to employ are partially hydrogenated vegetable oils such as soybean, cottonseed or palm oil or mixtures thereof which are available commercially under such names as Crisco (Procter & Gamble); Diamond D-20, Paramount X and Hydrol 100 (Durkee Foods, Inc.); Margarine Oil 8152 (Anderson-Clayton Co.), butterfat, lard, combinations of vegetable and animal fats and the like.

In accordance with another embodiment of the invention, a low calorie butter spread is produced using a low D.E. starch hydrolyzate to replace part of the natural butterfat. Thus, an aqueous solution of the low D.E. starch hydrolyzate is first prepared by dispersing say, for example, 30 parts of the hydrolyzate in 50 parts of water. Then, say 30 parts of softened butter is added slowly with vigorous mixing to produce an oil-in-water emulsion. Salt, butter flavor, color and preservatives can then be added, if desired. The emulsion is then cooled to a temperature between about 15° and 25° C. and mixed vigorously again for a brief period to induce phase inversion. Mixing is continued until the entire mixture forms a plastic water-in-oil emulsion which has the texture, mouthfeel, taste and spreading characteristics of natural butter.

As with the imitation margarine, natural butter is employed in an amount such that the fat in the resulting composition ranges from about 15 to 35% by weight and the starch hydrolyzate is employed in an amount so as to constitute from about 15 to 35% by weight of the composition and the weight ratio of fat to starch hydrolyzate as previously indicated. Natural butter comprises about 80% fat and contains about 7 calories per gram. By replacing the butter with the low D.E. starch hydrolyzate, a butter spread is obtained containing not more than 35% fat and less than 3.5 calories per gram.

In accordance with another embodiment of the invention, there is provided a dry imitation margarine or butter product as described above. This dry product consists essentially of a mixture of an edible fat and a low D.E. starch hydrolyzate which can be easily reconstituted with water and blended to a low calorie, low fat spread at the consumer level. Thus, a dry, reconstitutable, low calorie spread is obtained by preparing an oil-in-water emulsion using a fat, low D.E. starch hydrolyzate and water as described above. The oil-in-water emulsion plus any desired flavor and colors is then dried by any suitable process, such as freeze drying or spray drying to reduce the moisture content to less than about 6%. In preparing the oil-in-water emulsion and during the drying step it is important that agitation be minimized and temperatures maintained sufficiently high, i.e., above about 30° C., to prevent phase inversion prior to drying. In other words, the emulsion should be maintained as an oil-in-water type until drying is completed. After drying or removal of excess moisture, the low D.E. starch hydrolyzate provides a protective film for the fat droplets and reduces oxidative deterioration of the fat and loss of volatile flavor constituents. The dry product can be stored without refrigeration until it is desired to prepare a plastic spread. The ultimate consumer can accomplish this by slowly stirring the dry product into water accompanied by mixing such as is obtainable with kitchen blenders.

The starch hydrolyzates which are used in accordance with the present invention are low D.E. starch hydrolyzate products which when used in appropriate amounts promote formation of water-in-oil emulsions between mixtures of water and fat. By low D.E. starch hydrolyzate is meant a starch hydrolyzate having a D.E. value (dextrose equivalent value) below 25. Useful starch hydrolyzates are further characterized as being highly soluble in water and exhibit a low tendency to form rigid gels. Such starch hydrolyzates can be produced by enzyme hydrolysis or by a combination of acid and enzyme hydrolysis of a waxy or non-waxy starch such as starch derived from corn, tapioca, rice, red or white milo, wheat and other similar starch sources. Since the ability to promote water-in-oil emulsions is essential for the purposes of this invention, the starch hydrolyzate must be prepared by a process which does not promote gel formation in the presence of water prior to emulsification with fat. Accordingly, the hydrolyzates are preferably derived from starches as exemplified above, using a process which produces a narrow range of glucose polymers such that the hydrolyzate exhibits a low tendency to form a rigid gel when added to water.

The preparation of low D.E. starch hydrolyzates has been described in a number of United States patents, such as U.S. Pat. Nos. 3,663,369, 3,853,706, 3,849,194, 4,298,400 and Re. 30,880. The processes described in these patents can be practiced to prepare the starch hydrolyzates having a narrow molecular weight range of glucose polymers. The starch hydrolyzates with dextrose equivalent values below 25 are commonly referred to in the art as maltodextrins and are commercially available from Grain Processing Corporation, Muscatine, Iowa, under the trademark "Maltrin". For use in this invention, starch hydrolyzates having D.E. values up to about 25 can be employed, but it is preferred to employ the lower D.E. starch hydrolyzates having D.E. values say from about 5 to 10. The reason for this preference is that maltodextrins having higher D.E. values may impart a slight sweetness which some may find objectionable in a low calorie spread, and also with the higher D.E. maltodextrins there is a greater tendency for syneresis to occur, that is, separation of the aqueous phase following initial preparation of the spread.

The following examples further illustrate the invention and the advantages thereof.

EXAMPLE 1

This example illustrates the preparation of low fat imitation margarines using low D.E. starch hydrolyzates emulsified in hydrogenated vegetable oil.

"MALTRIN" M-040* or "MALTRIN" M-100** was dispersed in water at room temperature using a high speed blender. Hydrogenated vegetable oil (commercially available under the designation "Crisco") which had been melted and cooled to 45° C. was added slowly to the solution while mixing. When all the fat was added, salt, butter flavor and food color were added and mixing continued until phase inversion occurred and a smooth, plastic emulsion was formed. The butter-like product was poured into small cups and refrigerated overnight. Evaluation of several products are shown below:

\* MALTRIN M-040 is a commercially available (Grain Processing Corporation, Muscatine, Iowa) corn starch hydrolyzate having a D.E. value of about 5.
\*\* MALTRIN M-100 is a commercially available (Grain Processing Corporation, Muscatine, Iowa) corn starch hydrolyzate having a D.E. value of about 10 produced in accordance with U.S. Pat. No. 3,663,369.

TABLE 1

| No. | Type of Hydrolyzate | Amount, grams | H$_2$O ml. | Fat, grams | Evaluation |
|---|---|---|---|---|---|
| 1 | "MALTRIN" M-100 (10 DE) | 50 | 150 | 40 | Slight separation |
| 2 | " | 50 | 150 | 50 | Good butter-like texture |
| 3 | " | 50 | 150 | 60 | " |
| 4 | "MALTRIN" M-100 (10 DE) | 60 | 140 | 40 | Good butter-like texture |
| 5 | " | 60 | 140 | 50 | " |
| 6 | " | 60 | 140 | 60 | " |
| 7 | "MALTRIN" M-040 (5 DE) | 50 | 150 | 40 | Slight separation |
| 8 | " | 50 | 150 | 50 | Good butter-like texture |
| 9 | " | 50 | 150 | 60 | " |
| 10 | "MALTRIN" M-040 (5 DE) | 60 | 140 | 40 | Good butter-like texture |

TABLE 1-continued

| | Composition | | | | |
|---|---|---|---|---|---|
| No. | Type of Hydrolyzate | Amount, grams | $H_2O$ ml. | Fat, grams | Evaluation |
| 11 | " | 60 | 140 | 50 | " |
| 12 | " | 60 | 140 | 60 | " |

EXAMPLE 2

This example demonstrates the use of several different fats and fat blends for the preparation of butter-like products with maltodextrin.

"MALTRIN" M-100 was dispersed in water at 30°–35° C., as shown in the table below. The different samples of fat listed were heated until melted, then cooled to 35°–40° C. and mixed vigorously with the maltodextrin solution in a food blender to form an oil-in-water emulsion. The emulsion was cooled to about 20° C., then blended again until a plastic, butter-like product was obtained.

Crisco, D-20, Hydrol 100, lard and butter produced products with a good butter-like texture while PS-12 did not form a satisfactory product. Margarine oil by itself did not form a satisfactory product but when blended with Crisco readily formed a plastic, butter-like texture.

TABLE 2

| | Composition | | | | | |
|---|---|---|---|---|---|---|
| | Maltodextrin | | | Fat | | |
| No. | Type | Amount grams | $H_2O$ ml. | Type | Amount grams | Results |
| 1 | M-100 | 60 | 130 | Crisco* | 60 | Good - butter-like texture |
| 2 | M-100 | 60 | 130 | D-20* | 60 | Good - butter-like texture |
| 3 | M-100 | 60 | 130 | Hydrol 100* | 60 | Good - butter-like texture |
| 4 | M-100 | 60 | 130 | PS-12* | 60 | Poor - incomplete emulsification |
| 5 | M-100 | 60 | 130 | Margarine Oil 8152* | 60 | Poor - very soft texture |
| 6 | M-100 | 60 | 130 | Margarine Oil 8152 | 40 | Good - butter-like texture |
| | | | | Crisco | 20 | |
| 7 | M-100 | 60 | 130 | Lard | 60 | Good - butter-like texture |
| 8 | M-100 | 50 | 120 | Butter | 80 | Good - butter-like texture |

*Crisco available commercially from Procter & Gamble Co.
D-20 available commercially from Diamond Chemical
Hydrol 100 available commercially from Durkee Foods, Inc.
PS-12 available commercially from Anderson-Clayton Company
Margarine Oil 8152 available commercially from Anderson-Clayton Company

EXAMPLE 3

A spray dried, 10 D.E. maltodextrin ("MALTRIN" M-100) was dissolved in water (25° C.) at concentrations ranging from about 9 to 50% solids by weight. The solutions of maltodextrin were stirred vigorously in a blender and partially hydrogenated vegetable fat (commercial Crisco) added slowly to provide final fat concentrations of 10 to 28%. The ratio of fat to maltodextrin was varied from 0.7 to 1.2. After stirring for 1–5 minutes, some of the mixtures formed complete emulsions with plastic, butter-like properties, while others were incompletely emulsified with varying amounts of the aqueous phase separated to form two distinct phases and generally lacked butter-like properties. The individual samples were transferred to separate containers and evaluated for completeness of emulsification, syneresis or weeping, and overall butter-like texture.

The results are given in Table 3. The results show that solid, butter-like emulsions were obtained with Crisco fat levels of 16 to 22%. Below a 16% fat level it was impossible to obtain a butter-like emulsion, while above a 22% level of Crisco fat the emulsion acquired a creamy, topping-like consistency. The ratio of fat to maltodextrin had a marked effect on the completeness of emulsification and weeping at Crisco fat levels below 22%. The best butter-like products were obtained using Crisco fat:maltodextrin weight ratios of 0.7:1 and 0.8:1. However, with other fats, such as natural butterfat, higher levels can be used to obtain a product having an excellent butter-like texture.

TABLE 3

| | Composition, gm. | | | | | Volume | | Texture and |
|---|---|---|---|---|---|---|---|---|
| Sample No. | Maltodextrin | $H_2O$ | Fat | % Fat | Ratio Fat/MALTRIN | Free Liquid | Weeping | Overall Butter-like Properties |
| 1 | 31.2 | 193 | 25 | | 0.8 | 160 ml | — | No emulsion formed. |
| 2 | 25.0 | 200 | " | 10 | 1.0 | 160 ml | — | |
| 3 | 20.8 | 204 | " | | 1.2 | 160 ml | — | |
| 4a | 57 | 143 | 40 | | 0.7 | Trace | None | Good |
| 4b | 50 | 160 | " | 16 | 0.8 | 10 | Moderate | Good |
| 5 | 40 | 170 | " | | 1.0 | 10 | Moderate | Good |
| 6 | 33 | 177 | " | | 1.2 | 40 | Severe | Poor |
| 7a | 71.5 | 128 | 50 | | 0.7 | Trace | None | Very Good |
| 7b | 62.5 | 133 | " | 20 | 0.8 | 10 | Trace | Good |
| 8 | 50 | 150 | " | | 1.0 | 10 | Moderate | Good |
| 9 | 41.6 | 159 | " | | 1.2 | 60 | Severe | Poor |
| 10a | 78.5 | 116 | 55 | | 0.7 | 0 | None | Very Good |
| 10b | 69 | 126 | " | 22 | 0.8 | Trace | None | Fairly Good |

TABLE 3-continued

| Sample No. | Maltodextrin | H₂O | Fat | % Fat | Ratio Fat/MALTRIN | Volume Free Liquid | Weeping | Texture and Overall Butter-like Properties |
|---|---|---|---|---|---|---|---|---|
| 11 | 55 | 150 | " |  | 1.0 | Trace | None | Fairly Good |
| 12 | 46 | 149 | " |  | 1.2 | Trace | None | Too Firm |
| 13 | 75 | 115 | 60 |  | 0.8 | Trace | None | Fair |
| 14 | 60 | 130 | " | 24 | 1.0 | Trace | None | Fair |
| 15 | 50 | 140 | " |  | 1.2 | Trace | None | Fair |
| 16 | 87 | 93 | 70 |  | 0.8 | 0 | None | Poor |
| 17 | 70 | 110 | " | 28 | 1.0 | 0 | None | Poor |
| 18 | 58 | 122 | " |  | 1.2 | Trace | None | Poor |

EXAMPLE 4

Solutions of maltodextrins having D.E. values of 4, 10 and 20 were prepared by dispersing in water at 25° C. using a high speed blender and allowed to stand for 30 minutes. Fresh butter at room temperature was added slowly to the solutions of maltodextrin with vigorous mixing. Mixing was continued until phase inversion occurred and the entire mixture was completely emulsified and formed a plastic, water-in-oil emulsion butter-like product. Butter flavor, salt and food color were added and mixed and the resulting butter-like product transferred to containers for storage and evaluation. The results, which are summarized in the following table, show that good, butter-like properties were obtained with all three maltodextrins when used in the ratio of 75 parts butter, 50 parts maltodextrin, 125 parts water (30:20:50). A comparison of the three types of maltodextrin showed the weeping tendency of the butter was reduced as the D.E. was lowered.

TABLE 4

| No. | Maltodextrin Type | Amount grams | H₂O | Fat Type | Amount grams | Ratio Fat/Maltodextrin | Results |
|---|---|---|---|---|---|---|---|
| 1 | "MALTRIN" M-040 | 50 | 125 | Butter | 75 | 1.2 | Complete emulsification, no weeping, good texture |
| 2 | "MALTRIN" M-100 | 50 | 125 | Butter | 75 | 1.2 | Complete emulsification, good texture, slight weeping |
| 3 | "MALTRIN" M-200* | 50 | 125 | Butter | 75 | 1.2 | Complete emulsification, good texture, slight weeping |
| 4 | "MALTRIN" M-040 | 30 | 145 | Butter | 75 | 2.0 | Incomplete emulsification |
| 5 | "MALTRIN" M-040 | 60 | 115 | Butter | 75 | 1.0 | No emulsion formed |

*MALTRIN M-200 is a commercially available (Grain Processing Corporation, Muscatine, Iowa) corn starch hydrolyzate having a D.E. value of about 20 produced in accordance with U.S. Pat. No. 3,663,369.

EXAMPLE 5

The following ingredients were combined to obtain a 5-pound batch of low calorie spread.

| Ingredients | % | Weight, grams |
|---|---|---|
| "MALTRIN" M-040 | 20 | 460 |
| Tap Water | 46 | 1,070 |
| Butter | 33.3 | 750 |
| Salt | .25 | 10 |
| Potassium Sorbate | .05 | 1.2 |
| Butter Flavor | .30 | 8.0 |
| Beta-Carotene in Vegetable Oil (5 mg/ml) | .10 | 2.3 |

Procedure: The maltodextrin ("MALTRIN" M-040) was dispersed in tap water using a high speed blender and heated to 90° C. for 30 minutes. The resulting solution was cooled to 35° C. The salt, butter flavor and potassium sorbate was added and the solution transferred to a one gallon Waring Blender. Soft butter at room temperature was added slowly and blended to form an oil-in-water emulsion. Beta-carotene was added for color and the entire mixture cooled to approximately 20° C. The mixture was blended again for several minutes which caused inversion to a water-in-oil emulsion which exhibited a plastic, butter-like texture and a taste very similar to natural butter. Compared to natural butter at 80% fat and 7 calories per gram, the diet spread produced in this example had only 27% fat and only 3.2 calories per gram.

EXAMPLE 6

This example illustrates a preferred embodiment of the present invention wherein diet spreads are produced in the form of a dry product which can be readily reconstituted with water and mixed in a blender to form a plastic spread with the texture and taste of natural butter.

An emulsion having the composition described in Example 5 was prepared. In order to reduce the tendency for phase inversion prior to drying, a small excess of water (5%) was added and blending time was minimized. One portion of the emulsion was then dried in a freeze drier and a second portion was dried in a spray drier. Both portions were recovered as a free-flowing powder. Reconstitution was carried out by dispersing 100 grams of the dry powder in 125 milliliters of cool water (approximately 20°) in a food blender. Mixing was continued for a brief period to accomplish phase inversion and produce a homogeneous, plastic spread having the texture, taste and color of natural butter.

It will be appreciated that conventional edible flavoring agents and color can be added to the spread compositions of the invention in small amounts according to preferences.

The low fat spreads according to this invention have a large number of uses in both human and animal foods. Thus, in addition to use as spreads in lieu of butter or margarine, the compositions of the invention can be used in low calorie peanut butter, ice cream, mayonnaise and other water-in-oil emulsion foods. Similarly, while the compositions of the invention are referred to as spreads, as are butter and margarine customarily, the compositions can be used in other forms such a large mass or glob similar to sour cream on baked potatoes, or the composition can be sprinkled directly on a food or employed in the form of a coating on the surface of solid particles such as animal feed.

Those modifications and equivalents which fall within the spirit of the invention are to be considered a part thereof.

What is claimed is:

1. A low fat spread comprising a blend of an edible fat suitable for butter substitutes, a non-gelled starch hydrolyzate having a D.E. of about 4 and not more than 25 and water, such blend being a water-in-oil emulsion and having the approximate consistency of natural butter at room temperature wherein the edible fat is employed in an amount of from about 15 to 35% by weight of the spread and the starch hydrolyzate is employed in an amount of from about 15 to 35% by weight of the spread.

2. A low fat spread in accordance with claim 1 wherein the starch hydrolyzate is one having a D.E. value of 5 to 10.

3. A low fat spread in accordance with claim 1 wherein the edible fat is a partially hydrogenated vegetable fat.

4. A low fat spread in accordance with claim 1 wherein the edible fat is natural butterfat.

5. A low fat spread in accordance with claim 1 wherein the edible fat is a blend of a partially hydrogenated vegetable fat and natural butterfat.

6. A low fat spread in accordance with claim 1 wherein the edible fat has a melting point above about 38° C.

7. A low fat spread in accordance with claim 1 wherein the spread contains about 20% by weight fat, about 25% by weight starch hydrolyzate and about 55% by weight water.

8. A low fat spread in accordance with claims 1, 2, 3, 4 or 5 which also includes a flavoring agent.

9. A low fat spread in accordance with claims 1, 2, 3, 4 or 5 which also includes a coloring agent.

10. A low fat spread in accordance with claim 1 wherein the weight ratio of fat to starch hydrolyzate is in the range of 0.5:1 to 1.6:1.

11. A process for producing a low fat spread which comprises dispersing in water a starch hydrolyzate in an amount of from about 15 to 35% by weight of the spread having a D.E. value of about 4 and not more than 25 to form a non-gelled dispersion, adding to said aqueous dispersion while mixing an edible fat suitable for butter substitutes in an amount of from about 15 to 35% by weight of the spread to form initially an oil-in-water emulsion, continuing the mixing under conditions such that phase inversion occurs and a water-in-oil emulsion is formed having the consistency of natural butter at room temperature.

12. A process in accordance with claim 11 wherein the starch hydrolyzate is one having a D.E. value of 5 to 10.

13. A process in accordance with claims 11 or 12 wherein a flavoring agent is incorporated with the fat and starch hydrolyzate.

14. A process in accordance with claims 11 or 12 wherein a coloring agent is incorporated with the fat and starch hydrolyzate.

15. A process in accordance with claim 11 wherein the edible fat is a partially hydrogenated vegetable oil.

16. A process in accordance with claim 11 wherein the edible fat is natural butterfat.

17. A process in accordance with claim 11 wherein the edible fat is a blend of a partially hydrogenated vegetable oil and natural butterfat.

18. A process in accordance with claim 11 wherein the fat has a melting point above about 38° C.

19. A process in accordance with claim 11 wherein the weight ratio of fat to starch hydrolyzate is in the range of 0.5:1 to 1.6:1.

* * * * *